(12) United States Patent
Namburi et al.

(10) Patent No.: US 8,152,437 B2
(45) Date of Patent: Apr. 10, 2012

(54) INTERFACE MEMBER FOR A POWER PLANT

(75) Inventors: Adi Narayana Namburi, Bangalore (IN); Hayagreeva Kv Rao, Pradesh (IN)

(73) Assignee: General Electric Company, Schenectady, NY (US)

( * ) Notice: Subject to any disclaimer, the term of this patent is extended or adjusted under 35 U.S.C. 154(b) by 1066 days.

(21) Appl. No.: 12/045,441

(22) Filed: Mar. 10, 2008

(65) Prior Publication Data

US 2009/0226311 A1  Sep. 10, 2009

(51) Int. Cl.
*F01D 1/02* (2006.01)

(52) U.S. Cl. ............ 415/1; 415/116; 415/199.5

(58) Field of Classification Search .......... 415/1, 115, 415/116, 117, 175, 176, 199.5; 416/115, 416/116, 117, 175, 176, 199.5
See application file for complete search history.

(56) References Cited

U.S. PATENT DOCUMENTS 6,443,695 B2 * 9/2002 Kikuchi et al. ............ 415/149.2
6,783,321 B2 * 8/2004 Lathrop et al. ............... 415/100

FOREIGN PATENT DOCUMENTS

| JP | 58167808 | * 10/1983 |
| JP | 58197401 | * 11/1983 |
| JP | 59085402 | *  5/1984 |

OTHER PUBLICATIONS

Abstract of JP 58167808 to Kobayashi et al., Oct. 1983.*
Abstract of JP 59085402 to Imamura, May 1984.*
Imamura, Takuya; Geothermal Turbine; Nov. 17, 1983 Abstract of JP 58197401.*

* cited by examiner

*Primary Examiner* — Edward Look
*Assistant Examiner* — Liam McDowell
(74) *Attorney, Agent, or Firm* — Cantor Colburn LLP

(57) ABSTRACT

A power plant includes a first turbine having a plurality of turbine stages. The first turbine discharges a first fluid flow. A second turbine is operatively coupled to the first turbine. The second turbine receives the first fluid flow from the first turbine and a second fluid flow. An interface member is mounted between the first and second turbines. The interface member includes a main body portion having an inner surface, an inlet portion and an outlet portion that combine to form a fluid flow path that extends between the first and second turbines. The interface member further includes an input member having an input passage that leads the second fluid into the fluid flow path. The interface member also includes a baffle plate that extends toward the fluid flow path. The baffle plate establishes a flow gap between the input passage and the inlet and outlet portions.

10 Claims, 5 Drawing Sheets

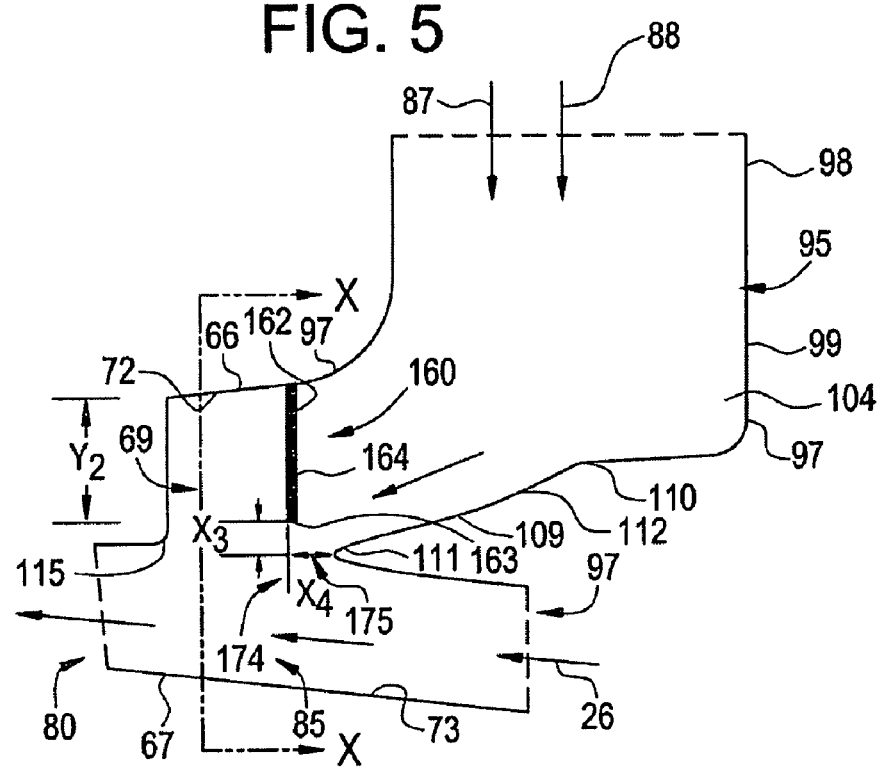
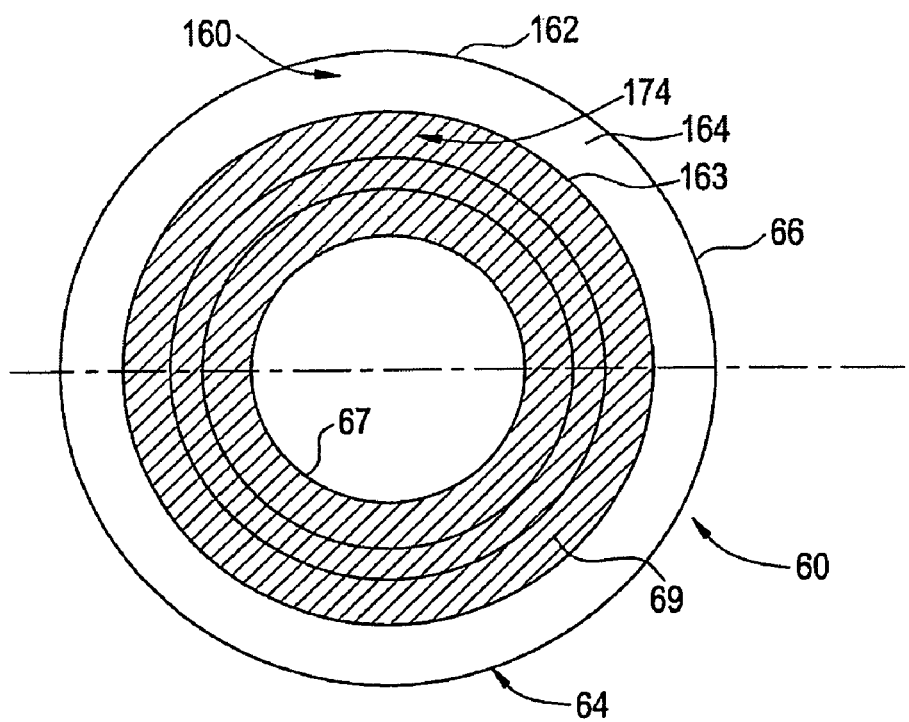

INTERFACE MEMBER FOR A POWER PLANT

BACKGROUND OF THE INVENTION

The present invention is directed to a power plant and, more particularly, to an interface member for a power plant.

Steam turbines particularly combined cycle plant (CCP) steam turbines include an Intermediate Pressure (IP) turbine and a Low Pressure (LP) turbine that are joined by a vertical joint. A substantial portion of fluid flow at or near the vertical joint is exhaust flow from the IP turbine. One or more nozzles supply LP steam that is combined with a high temperature leak-off steam from another portion of the power plant through radial pipes near the vertical joint. When there is little or no supply of LP steam, the high temperature leak-off steam dominates the flow through the nozzles. The combination of IP exhaust and high temperature leak off steam creates a non-uniform circumferential temperature distribution at the vertical joint, in shell members, and also around first stage nozzles of the LP turbine. Large circumferential temperature variations may result in distortions at the vertical joint. Distortions at the vertical joint eventually lead to steam leakage, which lowers turbine efficiency. High peak temperatures in at the vertical joint will also negatively affect material strength properties of carbon steel plates used to form a LP hood section of the LP turbine.

BRIEF DESCRIPTION OF THE INVENTION

A power plant constructed in accordance with exemplary embodiments oft the present invention includes a first turbine having a plurality of turbine stages. The first turbine discharges a first fluid flow. A second turbine is operatively coupled to the first turbine. The second turbine receives the first fluid flow from the first turbine and a second fluid flow. An interface member is mounted between the first and second turbines. The interface member includes a main body portion having an inner surface, an inlet portion and an outlet portion that combine to form a fluid flow path that extends between the first and second turbines. The interface member further includes an input member provided on the main body between the inlet portion and outlet portion. The input member includes an input passage that leads the second fluid into the fluid flow path. The interface member also includes a baffle plate that extends toward the fluid flow path. The baffle plate establishes a flow gap between the input passage and the inlet and outlet portions that increases residence time of the second fluid in the interface member.

A method of operating a power plant is provided in accordance with another exemplary embodiment of the present invention. The method includes delivering a first fluid flow from a first turbine, into a flow path of an interface member, guiding a second fluid flow toward the flow path, and passing the second fluid now across a baffle plate provided in the interface member. The method further requires introducing the second fluid flow into the first fluid flow to form a combined fluid flow, and passing the combined fluid flow from the flow path into a second turbine. Passing the second fluid flow across the baffle plate results in a lower temperature of the second fluid flow to establish a substantially uniform temperature circumferentially about the interface member.

An interface member mounted between first and second turbines of a power plant is provided in accordance with yet another exemplary embodiment of the present invention. The interface member includes a main body portion having an inner surface, an inlet portion and an outlet portion that combine to form a fluid flow path that extends between the first and second turbines. The interface member further includes an input member provided on the main body between the inlet portion and outlet portion. The input member includes an input passage that leads into the fluid flow path. The interface member also includes a baffle plate that extends toward the fluid flow path. The baffle establishes a flow gap between the input passage and the inlet and outlet portions.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

FIG. 5 is a partial cross sectional view of the interface member of FIG. 1 taken through the line 3-3 illustrating a baffle member constructed in accordance with a second exemplary embodiment of the present invention; and FIG. 6 is a cross-sectional view of the interface member of FIG. 5 taken through the line 4-4.

DETAILED DESCRIPTION OF THE INVENTION

Figure 1:
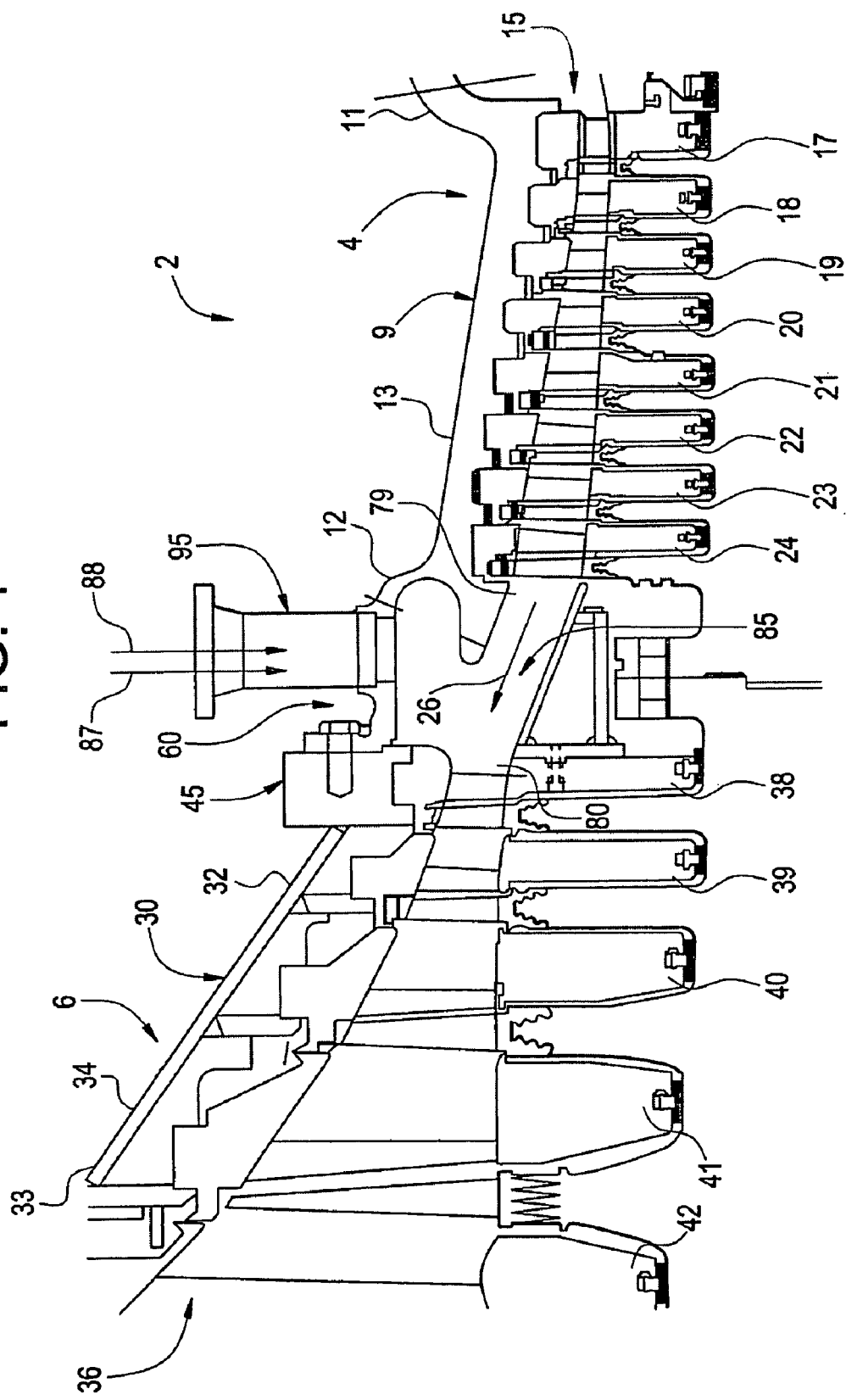
FIG. 1 is a partial, cross-sectional view of a combined cycle power plant including an interface member constructed in accordance with exemplary embodiments of the present invention.

With initial reference to FIG. 1, a power plant in accordance with an exemplary embodiment of the present invention is shown as a combined cycle power plant (CCP) indicated generally at 2. Power plant 2 includes a first or intermediate pressure (IP) turbine 4 operatively connected to a second or low pressure (LP) turbine 6. First turbine 4 includes a cast shell 9 having a first end portion 11 that extends to a second end portion 12 through an intermediate portion 13 to define an inner housing 15. Inner housing 15 encloses a plurality of turbine rotating assemblies or stages 17-24 from which pass a first fluid flow or exhaust gases 26. Second turbine 6 likewise includes a cast shell 30 having a first end portion 32 that extends to a second end portion 33 through an intermediate portion 34 to define an inner housing 36. Inner housing 36 encloses a plurality of turbine rotating assemblies or stages 38-42. Second turbine 6 also includes a hood 45 mounted at first end portion 32. In the exemplary embodiment shown, hood 45 is formed from a plurality of carbon steel plates (not separately labeled). First turbine 4 is operatively coupled to second turbine 6 through a vertical joint or interface member 60. Interface member 60 connects second end portion 12 of first turbine 4 with first end portion 32 of second turbine 6. Actually, interface member 60 joins second end portion 12 with hood 45 to connect first and second turbines 4 and 6.

Figure 2:
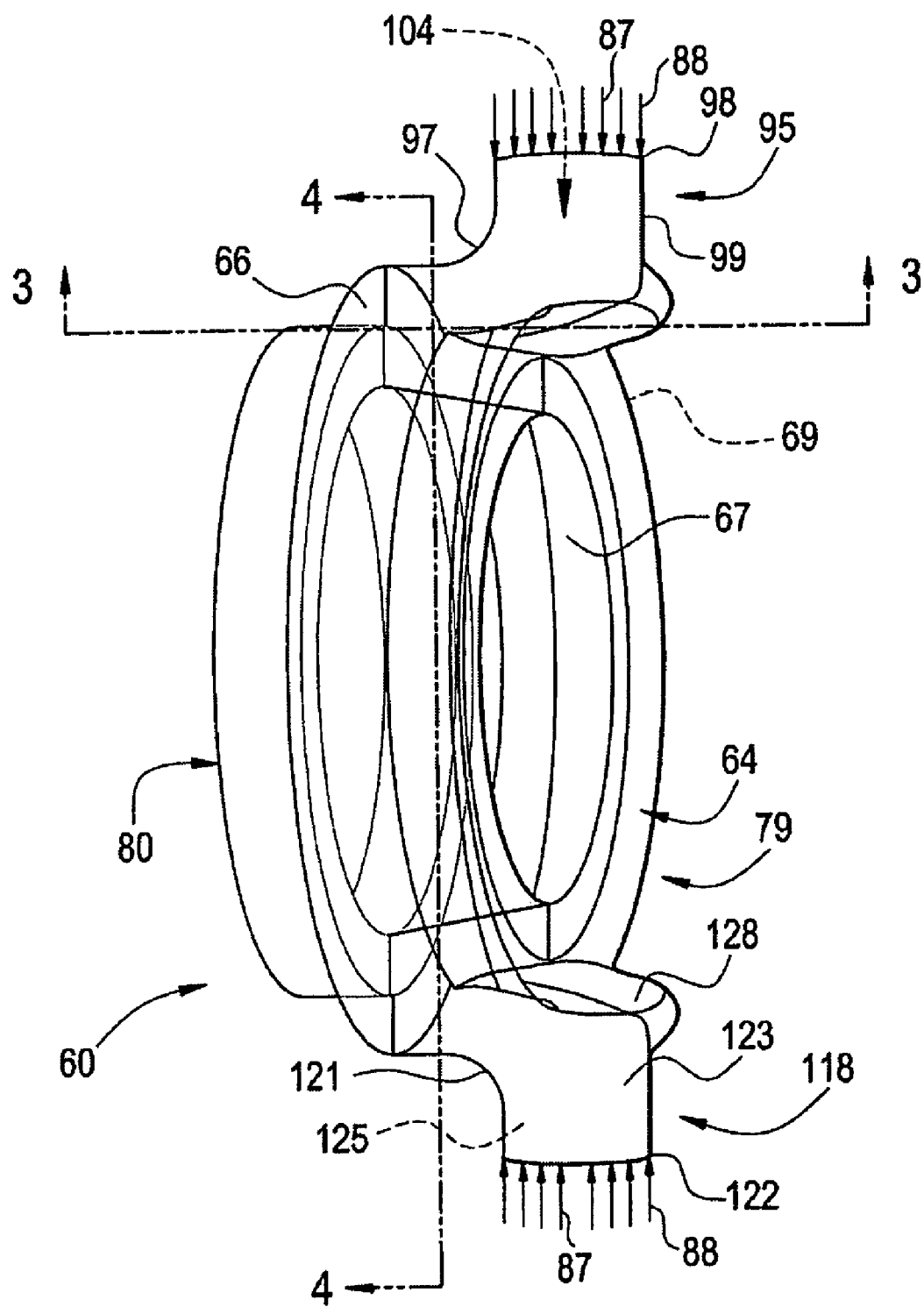
FIG. 2 is a perspective view of the interface member of FIG. 1.
Figure 3:
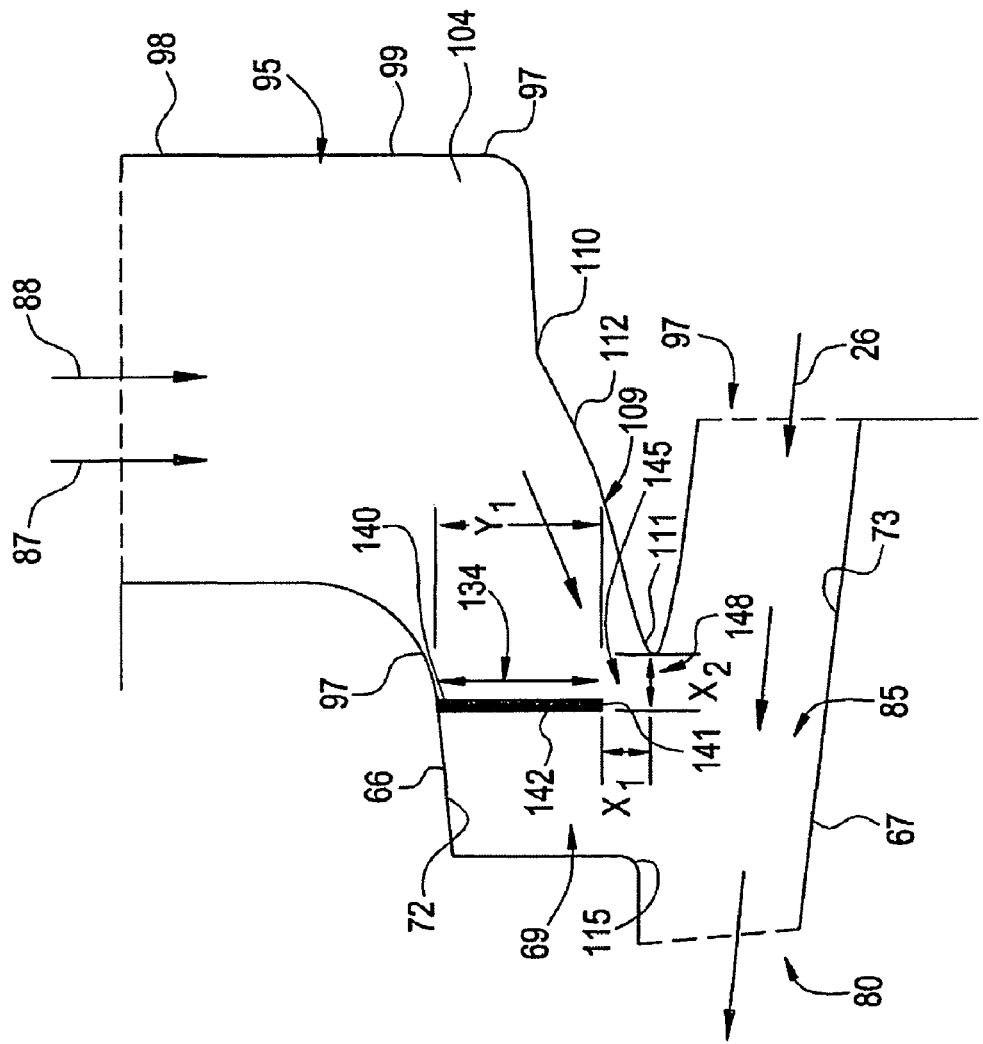
FIG. 3 is a partial cross sectional view of the interface member of FIG. 1 taken through the line 3-3 illustrating a baffle member constructed in accordance with a first exemplary embodiment of the present invention.

As best shown in FIGS. 2 and 3, interface member 60 includes a main body portion 64 having an outer diametric wall portion 66 and an inner diametric wall portion 67 that form an annular member having an inner circumferential region 69. Main body portion 64 further includes a first inner surface 72 and a second inner surface 73. Actually, first inner surface 72 is an opposing surface of outer diametric wall portion 66 while second inner surface 73 is an opposing surface of inner diametric wall portion 67. First and second inner surfaces 72 and 73 collectively define an inlet portion 79 and an outlet portion 80 that are joined by a flow path 85. Exhaust gases from first turbine 4 pass through inlet portion 79, move along flow path 85 and exit into second turbine 6 via outlet portion 80. In addition to exhaust gases 26 from first turbine 4, second turbine 6 selectively receives second fluid flow that is made up from a flow of LP steam 87 and/or a third fluid flow that is made up from a flow of high temperature leak-off steam 88 that is delivered from high pressure end packings (not shown) of another CCP component. LP steam 87 and/or high temperature leak-off steam 88 combine with the exhaust gases 26 in flow path 85 before passing to second turbine 6 as will be discussed more fully below.

As further shown in FIGS. 2 and 3, interface member 60 includes a first input member 95 having a first end portion 97 that extends outward from outer diametric wall portion 66 to a second end portion 98 through an intermediate portion 99. First input member 95 includes a first input passage 104 that extends from second end portion 98 through first end portion 97 and leads into flow passage 85. In the exemplary embodiment shown, first input member 95 joins interface member 60 through a transition piece 109 that conducts LP steam 87 and/or high temperature leak-off steam 88 into flow path 85. Transition piece 109 includes a first end 110 that extends from first end portion 97 of first input member 95 to a second end 111 through an angled intermediate portion 112. Second end 111 joins main body 64 adjacent flow path 85 to define an interface zone or mixing passage 115.

Interface member 60 also includes a second input member 118 having a first end portion 121 that extends outward from outer diametric wall portion 66 to a second end portion 122 through an intermediate portion 123. Second input member 118 includes a second input passage 125 that extends from second end portion 122 through first end portion 121 and leads into flow passage 85. In a manner similar to that described above, second input member 118 joins interface member 60 through a transition piece 128 that conducts LP steam 87 and/or high temperature leak-off steam 88 into flow path 85. When combined with LP steam 87, the temperature of the high temperature leak-off steam 88 is lowered such that upon mixing with exhaust gases 26 in flow passage 85, a combined fluid flow having substantially uniform temperatures at interface member 60 is produced. More specifically, during full load operation with LP steam 87 and leak-off steam 88 flows at peak levels, interface member 60 rises to peak temperatures of about 640° F. (337.7° C.) with circumferential temperature variations not exceeding about 10° F. (5.5° C.).

In contrast, when operating at off peak loads, LP steam 87 flow is reduced such that flow through input members 95 and 112 is formed almost entirely of high temperature leak-off steam 88. Without the LP steam 87 to lower temperatures, leak-off steam 88 mixes with exhaust gases 26 to form a combined high temperature flow that results in non-uniform temperatures at interface member 60. More specifically, at part load operation, with LP steam 87 at minimal levels and leak-off steam 88 at normal levels, interface member 60 rises to peak temperatures of about 858° F. (458.8° C.) with circumferential temperature variations in excess of 73° F. (40.5° C.). Large circumferential temperature variations can create distortions in cast shells 9 and 30 thereby limiting an overall duration of part load operation and establishing a minimal part load operation level.

In accordance with exemplary embodiments of the present invention, interface member 60 includes a baffle plate 134 that slows the now of the high temperature leak-off steam 88 allowing for greater residence time within transition piece 109. The longer residence time results in lower temperatures for the leak-off steam 88 thereby allowing longer operation at part load. Moreover, by lowering temperatures of the leak-off steam 88, CCP 2 can operate at part load conditions below previous minimal part load operation levels.

Figure 4:
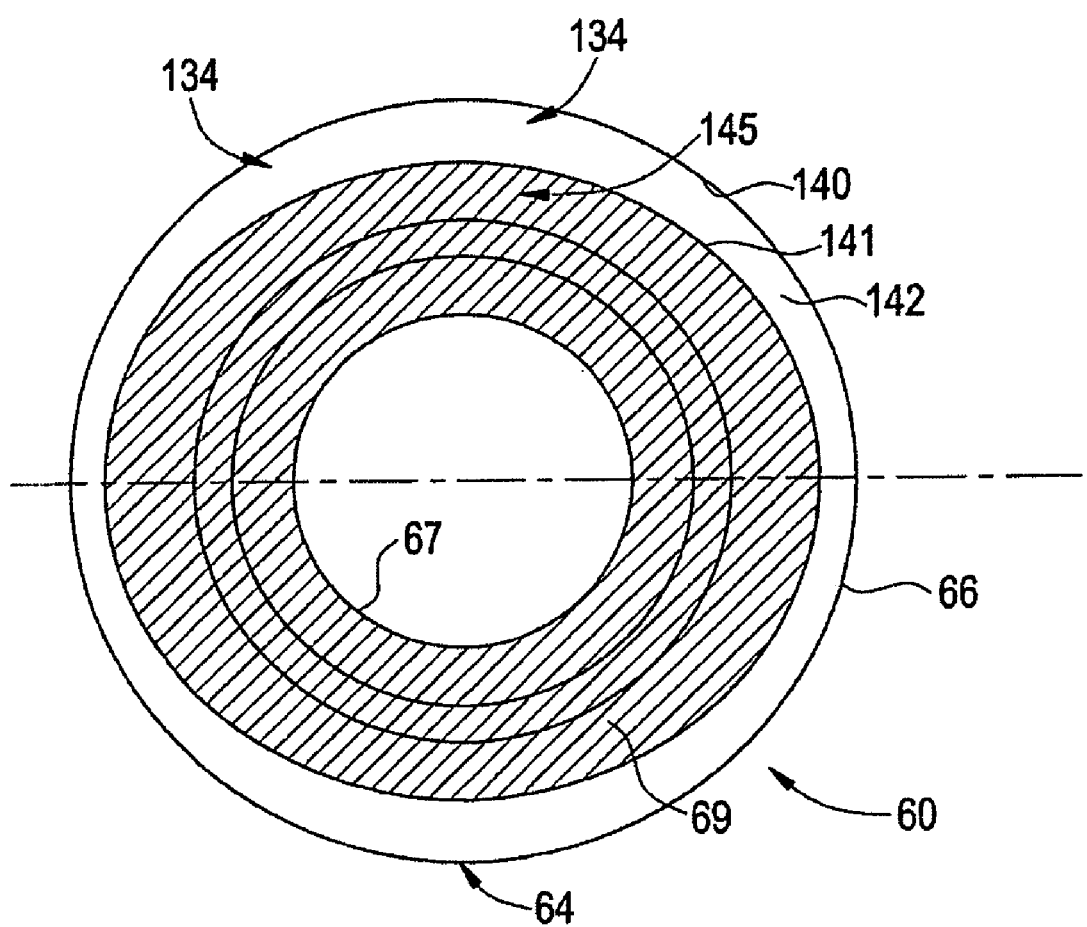
FIG. 4 is a cross-sectional view of the interface member of FIG. 3 taken through the line 4-4.

As best shown in FIGS. 3 and 4, baffle plate 134 includes a first end section 140 that extends to a second end section 141 through an intermediate section 142 to define a width Y1. As shown, second end section 141 is spaced from mixing passage 115 and second end 111 of transition piece 109 so as to define a flow gap 145 having a width X1. Baffle plate 134 also defines a second flow gap 148 having a length X2 defined between second end section 141 and second end 111 of transition piece 109. In accordance with the exemplary embodiment shown, width Y1 of baffle plate 134 varies circumferentially about interface member 60. More specifically, width Y1 is larger adjacent first and second input members 95 and 118 and narrower at other circumferential portions of interface member 60. With this arrangement, baffle plate 134 creates a non-uniform width X1 for flow gap 145. That is, width X1 of flow gap 145 varies circumferentially about interface member 60. Increasing residence time of the high temperature leak-off steam 88 within interface member 60 produces lower temperatures of the combined flow within flow path 85. At this point it should be understood, that baffle plate 134 establishes a similar flow arrangement at second input member 118.

Reference will now be made to FIGS. 5 and 6 in describing a baffle plate 160 constructed in accordance with another exemplary embodiment of the present invention. As shown, baffle plate 160 includes a first end section 162 extending to a second end section 163 through an intermediate section 164 to define a width Y2. As shown, second end section 162 is spaced from mixing passage 115 and second end 111 of transition piece 109 so as to define a flow gap 174 having a width X3. Baffle plate 160 also defines a second flow gap 175 having a length X4 defined between second end section 162 and second end 111 of transition piece 109. In accordance with the exemplary embodiment shown in FIGS. 5 and 6, width Y1 of baffle plate 160 remains constant circumferentially about interface member 60. With this arrangement, baffle plate 160 creates a uniform width X3 for flow gap 174. As noted above, increasing residence time of the high temperature leak-off steam 88 within interface member 60 lowers temperatures of the combined flow within flow path 85. At this point it should be understood that baffle plate 160 establishes a similar flow arrangement at second input member 118.

At this point it should be appreciated that the exemplary embodiments of the present invention elevate residence time of high temperature leak-off steam within an interface member prior to mixing with exhaust from a first or intermediate pressure turbine for delivery to a second or low-pressure turbine. By raising residence time of the high temperature leak-off steam, the combined cycle power plant can be operation at very low part load conditions for extended periods with having a negative impact on turbine structure such as turbine shells and hood plates.

In general, this written description uses examples to disclose the invention, including the best mode, and also to enable any person skilled in the art to practice the invention, including making and using any devices or systems and performing any incorporated methods. The patentable scope of the invention is defined by the claims, and may be includes other examples that occur to those skilled in the art. Such other examples are intended to be within the scope of the present invention if they have structural elements that do not differ from the literal language of the claims, or if they include equivalent structural elements with insubstantial differences from the literal language of the claims.

The invention claimed is:

1. A power plant comprising:
    a first turbine having a plurality of turbine stages, the first turbine discharging a first fluid flow;
    a second turbine operatively coupled to the first turbine, the second turbine receiving the first fluid flow from the first turbine and a second fluid flow;
    an interface member mounted between the first and second turbines, the interface member including a main body portion having an inner surface, an inlet portion and an outlet portion that combine to form a fluid flow path that extends between the first and second turbines, an input member provided on the main body portion between the inlet portion and outlet portion, the input member including an input passage that leads the second fluid into the fluid flow path, and a baffle plate extending about at least a portion of the inner surface of the interface member toward the fluid flow path, the baffle plate including a first end section that extends from the inner surface to a second end section that is spaced from the fluid flow path to establish a non-uniform radial flow gap extending about the main body portion and an axial flow gap between the input passage and the inlet and outlet portions that elevate residence time of the second fluid in the interface member.

2. The power plant according to claim 1, wherein the interface member is a substantially annular member having an outer diametric wall portion and an inner diametric wall portion that establish an inner circumferential region, the flow path extending across the inner circumferential region and the baffle plate extending radially outward from the outer diametric wall portion toward the flow path.

3. The power plant according to claim 1, wherein the axial flow gap is a uniform gap extending about the main body portion.

4. The power plant according to claim 1, wherein the first turbine is an intermediate pressure (IP) turbine, and the second turbine is a low pressure (LP) turbine.

5. The power plant according to claim 1, wherein the power plant is a combined cycle power plant.

6. A method of operating a power plant comprising:
    delivering a first fluid flow from a first turbine, into a flow passage of an interface member;
    guiding a second fluid flow toward the flow path;
    passing the second fluid flow across a baffle plate provided in the interface member through a non-uniform radial flow gap extending between the baffle plate and the flow path; and
    introducing the second fluid flow into the first fluid flow to form a combined fluid flow; and
    passing the combined fluid flow from the flow path into a second turbine, wherein the radial and axial flow gaps lower a temperature of the second fluid flow and establish a substantially uniform circumferential temperature about the interface member.

7. The method of claim 6, further comprising:
    guiding a third fluid flow toward the flow path;
    mixing the second and third fluid flows to form another combined fluid flow;
    passing the another combined fluid flow across the baffle plate; and
    introducing the another combined fluid flow into the first fluid flow.

8. An interface member mounted between first and second turbines of a power plant, the interface member comprising:
    a main body portion having an inner surface, an inlet portion and an outlet portion that combine to form a fluid flow path that extends between the first and second turbines;
    an input member provided on the main body between the inlet portion and outlet portion, the input member including an input passage that leads into the fluid flow path; and
    a baffle plate extending about at least a portion of the inner surface of the interface member toward the fluid flow path, the baffle plate including a first end section that extends from the inner surface to a second end section that is spaced from the fluid flow path to establish a non-uniform radial flow gap extending about the main body portion and an axial flow gap between the input passage and the inlet and outlet portions.

9. The interface member according to claim 8, wherein the main body portion is a substantially annular member having an outer diametric wall portion and an inner diametric wall portion that establish an inner circumferential region, the flow path extending across the inner circumferential region and the baffle plate extending radially outward from the outer diametric wall portion toward the flow path.

10. The interface member according to claim 8, wherein the axial flow gap is a uniform gap extending about the main body portion.

* * * * *